US010158213B2

(12) United States Patent
Burch

(10) Patent No.: US 10,158,213 B2
(45) Date of Patent: Dec. 18, 2018

(54) WORKSITE POWER DISTRIBUTION BOX

(71) Applicant: Milwaukee Electric Tool Corporation, Brookfield, WI (US)

(72) Inventor: Wade F. Burch, Wauwatosa, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 540 days.

(21) Appl. No.: 14/185,539

(22) Filed: Feb. 20, 2014

(65) Prior Publication Data

US 2014/0240902 A1 Aug. 28, 2014

Related U.S. Application Data

(60) Provisional application No. 61/767,868, filed on Feb. 22, 2013.

(51) Int. Cl.
*H02B 1/24* (2006.01)
*H02B 7/06* (2006.01)
(Continued)

(52) U.S. Cl.
CPC ............... *H02B 7/06* (2013.01); *H02B 1/52* (2013.01); *H02B 11/26* (2013.01)

(58) Field of Classification Search
CPC ............. H02B 7/06; H02B 1/52; H02B 11/26
(Continued)

(56) References Cited

U.S. PATENT DOCUMENTS 2,995,670 A 8/1961 Weiss et al.
3,786,312 A 1/1974 Roussard
(Continued)

FOREIGN PATENT DOCUMENTS

CA 2240862 7/1997
DE 3803357 8/1989
(Continued)

OTHER PUBLICATIONS

United States Patent Office Action for U.S. Appl. No. 13/662,093 dated Nov. 10, 2014 (13 pages).
(Continued)

*Primary Examiner* — Richard Tan
(74) *Attorney, Agent, or Firm* — Michael Best & Friedrich LLP

(57) ABSTRACT

A power distribution box apparatus and method for implementing a priority disconnect scheme and a network communication bridge at a worksite, where the power distribution box distributes temporary power. The power distribution box includes a housing portion and a base portion elevating the housing portion off of the ground or another surface. The power distribution box includes a communication module having a network connecting module operable to connect to an external communication network (e.g., the Internet), and a wireless network module operable to wirelessly communicate with an external device (e.g., a smart phone) to, thereby, connect the external device to the external communication network. The power distribution box may also include a priority disconnect module to selectively disconnect AC output receptacles in response to over-current situations based on a priority level associated with each receptacle.

22 Claims, 8 Drawing Sheets

(51) Int. Cl.
*H02B 11/26* (2006.01)
*H02B 1/52* (2006.01)

(58) Field of Classification Search
USPC ...... 307/18, 19, 31, 126, 131; 361/601, 602, 361/622, 626
See application file for complete search history.

(56) References Cited

U.S. PATENT DOCUMENTS

| | | | |
|---|---|---|---|
| 3,946,282 A | 3/1976 | Weiss et al. |
| 4,167,733 A | 9/1979 | Krause et al. |
| 4,318,156 A | 3/1982 | Gallagher |
| 4,639,726 A | 1/1987 | Ichikawa et al. |
| 4,757,267 A | 7/1988 | Riskin |
| 5,168,114 A | 12/1992 | Enget |
| 5,188,188 A | 2/1993 | Mars |
| 5,204,670 A | 4/1993 | Stinton |
| 5,223,844 A | 6/1993 | Mansell et al. |
| 5,406,269 A | 4/1995 | Baran |
| 5,428,546 A | 6/1995 | Shah et al. |
| 5,497,149 A | 3/1996 | Fast |
| 5,531,344 A | 7/1996 | Winner |
| 5,587,701 A | 12/1996 | Hess |
| 5,594,650 A | 1/1997 | Shah et al. |
| 5,612,668 A | 3/1997 | Scott |
| 5,627,517 A | 5/1997 | Theimer et al. |
| 5,664,113 A | 9/1997 | Worger |
| 5,666,010 A | 9/1997 | Stratiotis |
| 5,742,237 A | 4/1998 | Bledsoe |
| 5,745,036 A | 4/1998 | Clare |
| 5,758,313 A | 5/1998 | Shah et al. |
| 5,777,551 A | 7/1998 | Hess |
| 5,819,869 A | 10/1998 | Horton |
| 5,850,180 A | 12/1998 | Hess |
| 5,864,297 A | 1/1999 | Sollestre et al. |
| 5,884,216 A | 3/1999 | Shah et al. |
| 5,886,634 A | 3/1999 | Muhme |
| 5,894,392 A | 4/1999 | McDonald |
| 5,903,462 A | 5/1999 | Wagner et al. |
| 5,919,239 A | 7/1999 | Fraker et al. |
| 5,922,040 A | 7/1999 | Prabhakaran |
| 5,928,291 A | 7/1999 | Jenkins et al. |
| 5,942,975 A | 8/1999 | Sorensen |
| 5,949,335 A | 9/1999 | Maynard |
| 6,005,489 A | 12/1999 | Siegle et al. |
| 6,025,780 A | 2/2000 | Bowers et al. |
| 6,049,273 A | 4/2000 | Hess |
| 6,067,570 A | 5/2000 | Kreynin et al. |
| 6,088,648 A | 7/2000 | Shah et al. |
| 6,123,241 A | 9/2000 | Walter et al. |
| 6,137,414 A | 10/2000 | Federman |
| 6,154,995 A | 12/2000 | Lenoir et al. |
| 6,166,688 A | 12/2000 | Cromer et al. |
| 6,225,890 B1 | 5/2001 | Murphy |
| 6,225,906 B1 | 5/2001 | Shore |
| 6,232,877 B1 | 5/2001 | Ashwin |
| 6,232,884 B1 | 5/2001 | Gabbard |
| 6,244,758 B1 | 6/2001 | Solymar et al. |
| 6,285,868 B1 | 9/2001 | LaDue |
| 6,300,863 B1 | 10/2001 | Cotichini et al. |
| 6,422,061 B1 | 7/2002 | Sunshine et al. |
| 6,469,615 B1 | 10/2002 | Kady et al. |
| 6,480,108 B2 | 11/2002 | McDonald |
| 6,505,106 B1 | 1/2003 | Lawrence et al. |
| 6,507,914 B1 | 1/2003 | Cain et al. |
| 6,520,270 B2 | 2/2003 | Wissmach et al. |
| 6,530,498 B1 | 3/2003 | Ovadia |
| 6,536,536 B1 | 3/2003 | Gass et al. |
| 6,577,104 B2 | 6/2003 | Sakakibara |
| 6,577,238 B1 | 6/2003 | Whitesmith et al. |
| 6,600,418 B2 | 7/2003 | Francis et al. |
| 6,607,041 B2 | 8/2003 | Suzuki et al. |
| 6,614,349 B1 | 9/2003 | Proctor et al. |
| 6,615,130 B2 | 9/2003 | Myr |
| 6,628,323 B1 | 9/2003 | Wedmann |
| 6,674,368 B2 | 1/2004 | Hawkins |
| 6,677,895 B1 | 1/2004 | Holt |
| 6,698,415 B2 | 3/2004 | Garcia et al. |
| 6,714,859 B2 | 3/2004 | Jones |
| 6,731,908 B2 | 5/2004 | Berliner et al. |
| 6,738,628 B1 | 5/2004 | McCall et al. |
| 6,801,853 B2 | 10/2004 | Workman |
| 6,831,557 B1 | 12/2004 | Hess |
| 6,845,279 B1 | 1/2005 | Gilmore et al. |
| 6,853,303 B2 | 2/2005 | Chen et al. |
| 6,853,907 B2 | 2/2005 | Peterson et al. |
| 6,853,916 B2 | 2/2005 | Fuchs et al. |
| 6,859,761 B2 | 2/2005 | Bensky et al. |
| 6,872,121 B2 | 3/2005 | Wiesner et al. |
| 6,889,139 B2 | 5/2005 | Prabhakaran |
| 6,898,415 B2 | 5/2005 | Berliner et al. |
| 6,933,849 B2 | 5/2005 | Berliner et al. |
| 6,961,541 B2 | 11/2005 | Overy et al. |
| 6,963,289 B2 | 11/2005 | Aljadeff et al. |
| 6,967,563 B2 | 11/2005 | Bormaster |
| 6,968,194 B2 | 11/2005 | Aljadeff et al. |
| 6,972,682 B2 | 12/2005 | Lareau et al. |
| 6,989,749 B2 | 1/2006 | Mohr |
| 6,993,351 B2 | 1/2006 | Fraser et al. |
| 7,030,731 B2 | 4/2006 | Lastinger et al. |
| 7,034,659 B2 | 4/2006 | Ungs |
| 7,034,683 B2 | 4/2006 | Ghazarian |
| 7,036,703 B2 | 5/2006 | Grazioli et al. |
| 7,038,573 B2 | 5/2006 | Bann |
| 7,042,360 B2 | 5/2006 | Light et al. |
| 7,050,907 B1 | 5/2006 | Janky et al. |
| 7,064,502 B2 | 6/2006 | Garcia et al. |
| 7,084,740 B2 | 8/2006 | Bridgelall |
| 7,098,792 B1 | 8/2006 | Ahlf et al. |
| 7,099,669 B2 | 8/2006 | Sheffield |
| 7,103,511 B2 | 9/2006 | Petite |
| 7,119,612 B1 | 10/2006 | Bertness et al. |
| 7,119,686 B2 | 10/2006 | Bertness et al. |
| 7,123,149 B2 | 10/2006 | Nowak et al. |
| 7,139,581 B2 | 11/2006 | Berliner et al. |
| 7,171,187 B2 | 1/2007 | Haave et al. |
| 7,173,529 B2 | 2/2007 | Przygoda, Jr. |
| 7,182,148 B1 | 2/2007 | Szieff |
| 7,209,041 B2 | 4/2007 | Hines et al. |
| 7,211,972 B2 | 5/2007 | Garcia et al. |
| 7,218,227 B2 | 5/2007 | Davis et al. |
| 7,228,917 B2 | 6/2007 | Davis et al. |
| 7,245,219 B2 | 7/2007 | Tan et al. |
| 7,274,293 B2 | 9/2007 | Bradus et al. |
| 7,277,009 B2 | 10/2007 | Hall et al. |
| 7,295,115 B2 | 11/2007 | Aljadeff et al. |
| 7,295,119 B2 | 11/2007 | Rappaport et al. |
| 7,298,240 B2 | 11/2007 | Lamar |
| 7,311,025 B1 | 12/2007 | Wilson, Jr. |
| 7,319,395 B2 | 1/2008 | Puzio et al. |
| 7,327,220 B2 | 2/2008 | Hess |
| 7,336,181 B2 | 2/2008 | Nowak et al. |
| 7,337,963 B2 | 3/2008 | Harper et al. |
| 7,339,477 B2 | 3/2008 | Puzio et al. |
| 7,346,358 B2 | 3/2008 | Wood et al. |
| 7,346,406 B2 | 3/2008 | Brotto et al. |
| 7,346,422 B2 | 3/2008 | Tsuchiya et al. |
| 7,382,272 B2 | 6/2008 | Feight |
| 7,391,299 B2 | 6/2008 | Bender et al. |
| 7,391,326 B2 | 6/2008 | Puzio et al. |
| 7,394,347 B2 | 7/2008 | Kady |
| 7,453,355 B2 | 11/2008 | Bergstrom et al. |
| 7,493,211 B2 | 2/2009 | Breen |
| 7,498,985 B1 | 3/2009 | Woo et al. |
| 7,522,049 B2 | 4/2009 | Aljadeff et al. |
| 7,540,334 B2 | 6/2009 | Gass et al. |
| 7,551,089 B2 | 6/2009 | Sawyer |
| 7,574,172 B2 | 8/2009 | Clark et al. |
| 7,576,635 B2 | 8/2009 | Bender et al. |
| 7,612,654 B2 | 11/2009 | Bender et al. |
| 7,613,590 B2 | 11/2009 | Brown |
| 7,638,958 B2 | 12/2009 | Philipp et al. |
| 7,639,119 B2 | 12/2009 | Carrender et al. |
| 7,640,105 B2 | 12/2009 | Nielsen et al. |

(56) References Cited

U.S. PATENT DOCUMENTS

| | | | |
|---|---|---|---|
| 7,649,464 B2 | 1/2010 | Puzio et al. | |
| 7,652,576 B1 | 1/2010 | Crossno et al. | |
| D609,182 S | 2/2010 | Ladewig et al. | |
| 7,669,765 B2 | 3/2010 | Harper et al. | |
| 7,675,410 B2 | 3/2010 | Aritsuka et al. | |
| 7,681,311 B2 | 3/2010 | Kaminski | |
| 7,688,028 B2 | 3/2010 | Phillips et al. | |
| 7,729,707 B2 | 6/2010 | Aljadeff et al. | |
| 7,734,476 B2 | 6/2010 | Wildman et al. | |
| 7,753,272 B2 | 6/2010 | Harper et al. | |
| 7,750,811 B2 | 7/2010 | Puzio et al. | |
| 7,755,482 B2 | 7/2010 | Hubbard | |
| 7,777,612 B2 | 8/2010 | Sampson et al. | |
| 7,782,626 B2 | 8/2010 | Buck et al. | |
| 7,784,104 B2 | 8/2010 | Innami et al. | |
| 7,786,861 B2 | 8/2010 | Howarth et al. | |
| 7,787,981 B2 | 8/2010 | Austin et al. | |
| 7,801,506 B2 | 9/2010 | Haave et al. | |
| 7,802,198 B2 | 9/2010 | Obradovich | |
| 7,817,405 B2 | 10/2010 | Neumann et al. | |
| 7,834,765 B2 | 11/2010 | Sawyer | |
| 7,834,766 B2 | 11/2010 | Sawyer | |
| 7,848,085 B2 | 12/2010 | Gerber | |
| 7,848,765 B2 | 12/2010 | Phillips et al. | |
| 7,852,222 B2 | 12/2010 | Johnson et al. | |
| 7,859,417 B2 | 12/2010 | Harper et al. | |
| 7,876,205 B2 | 1/2011 | Catten et al. | |
| 7,907,053 B2 | 3/2011 | Wildman et al. | |
| 7,911,344 B2 | 3/2011 | August et al. | |
| 7,928,845 B1 | 4/2011 | LaRosa | |
| 7,973,678 B2 | 7/2011 | Petricoin, Jr. et al. | |
| 7,973,707 B2 | 7/2011 | Verechtchiagine | |
| 7,982,624 B2 | 7/2011 | Richter et al. | |
| 7,999,670 B2 | 8/2011 | McClellan et al. | |
| 8,002,180 B2 | 8/2011 | Harper et al. | |
| 8,004,664 B2 | 8/2011 | Etter et al. | |
| 8,005,647 B2 | 8/2011 | Armstrong et al. | |
| 8,018,329 B2 | 9/2011 | Morgan et al. | |
| 8,026,814 B1 | 9/2011 | Heinze et al. | |
| 8,044,796 B1 | 10/2011 | Carr, Sr. | |
| 8,049,636 B2 | 11/2011 | Buckingham et al. | |
| 8,059,005 B2 | 11/2011 | Henricks et al. | |
| 8,084,686 B2 | 12/2011 | Ladewig et al. | |
| 8,095,070 B2 | 1/2012 | Twitchell, Jr. | |
| D656,099 S | 3/2012 | Gerber | |
| 8,159,345 B2 | 4/2012 | Stevens | |
| 8,169,298 B2 | 5/2012 | Wiesner et al. | |
| 8,208,939 B2 | 6/2012 | Aljadeff et al. | |
| 8,292,657 B2 | 10/2012 | Singh | |
| 8,542,090 B2 | 9/2013 | Calvet et al. | |
| 8,674,823 B1* | 3/2014 | Contario | H02J 1/10 340/333 |
| 9,055,033 B2 | 6/2015 | Mergener | |
| 9,466,198 B2 | 10/2016 | Burch et al. | |
| 9,949,075 B2 | 4/2018 | Burch et al. | |
| 2002/0033267 A1 | 3/2002 | Schwiezer et al. | |
| 2002/0089434 A1 | 7/2002 | Ghazarian | |
| 2002/0128769 A1 | 9/2002 | Der Ghazarian et al. | |
| 2002/0153418 A1 | 10/2002 | Maloney | |
| 2003/0043016 A1 | 3/2003 | Kady et al. | |
| 2003/0069648 A1 | 4/2003 | Douglas et al. | |
| 2003/0069694 A1 | 4/2003 | Fuchs et al. | |
| 2003/0102970 A1 | 6/2003 | Creel et al. | |
| 2003/0117316 A1 | 6/2003 | Tischer | |
| 2003/0228846 A1 | 12/2003 | Berliner et al. | |
| 2004/0107126 A1 | 6/2004 | Kataoka et al. | |
| 2004/0108120 A1 | 6/2004 | Weisner et al. | |
| 2004/0150508 A1 | 8/2004 | Mosgrove et al. | |
| 2004/0203870 A1 | 10/2004 | Aljadeff et al. | |
| 2004/0217864 A1 | 11/2004 | Nowak et al. | |
| 2005/0035659 A1 | 2/2005 | Hahn et al. | |
| 2005/0071124 A1 | 3/2005 | Komatsu | |
| 2005/0078006 A1 | 4/2005 | Hutchins et al. | |
| 2005/0122650 A1 | 6/2005 | Beasley, III et al. | |
| 2005/0128083 A1 | 6/2005 | Puzio et al. | |
| 2005/0150952 A1 | 7/2005 | Chung | |
| 2005/0156711 A1 | 7/2005 | Aljadeff et al. | |
| 2005/0197115 A1 | 9/2005 | Clark et al. | |
| 2005/0207381 A1 | 9/2005 | Aljadeff et al. | |
| 2005/0222933 A1 | 10/2005 | Wesby | |
| 2005/0225427 A1 | 10/2005 | Bell et al. | |
| 2005/0240495 A1 | 10/2005 | Harper et al. | |
| 2006/0071753 A1 | 4/2006 | Lamar | |
| 2006/0087283 A1 | 4/2006 | Phillips et al. | |
| 2006/0155582 A1 | 7/2006 | Brown | |
| 2006/0170395 A1 | 8/2006 | Yoshimizu et al. | |
| 2006/0187023 A1* | 8/2006 | Iwamura | H04B 3/542 340/538.11 |
| 2006/0256007 A1 | 11/2006 | Rosenberg | |
| 2006/0264173 A1 | 11/2006 | Gilbert | |
| 2006/0289213 A1 | 12/2006 | Cervantes | |
| 2007/0021100 A1 | 1/2007 | Haave et al. | |
| 2007/0108273 A1 | 5/2007 | Harper et al. | |
| 2007/0115127 A1 | 5/2007 | Harper et al. | |
| 2007/0160028 A1 | 7/2007 | Hein-Magnussen et al. | |
| 2007/0194942 A1 | 8/2007 | Darr | |
| 2007/0198748 A1* | 8/2007 | Ametsitsi | H04B 3/542 709/249 |
| 2007/0200664 A1 | 8/2007 | Proska et al. | |
| 2007/0252675 A1 | 11/2007 | Lamar | |
| 2007/0252696 A1 | 11/2007 | Belisle et al. | |
| 2008/0020781 A1 | 1/2008 | Cho | |
| 2008/0037512 A1 | 2/2008 | Aljadeff et al. | |
| 2008/0086266 A1 | 4/2008 | Howard et al. | |
| 2008/0100416 A1 | 5/2008 | Harper et al. | |
| 2008/0164311 A1 | 7/2008 | Harper et al. | |
| 2008/0165013 A1 | 7/2008 | Harper et al. | |
| 2008/0180241 A1 | 7/2008 | Hess | |
| 2008/0207267 A1 | 8/2008 | Gose | |
| 2008/0208522 A1 | 8/2008 | Lucke | |
| 2008/0236220 A1 | 10/2008 | Calvet et al. | |
| 2008/0238609 A1 | 10/2008 | Wiesner et al. | |
| 2008/0252431 A1 | 10/2008 | Nigam | |
| 2008/0252446 A1 | 10/2008 | Dammertz | |
| 2008/0269978 A1 | 10/2008 | Shirole et al. | |
| 2008/0319665 A1 | 12/2008 | Berkobin et al. | |
| 2009/0015372 A1 | 1/2009 | Kady | |
| 2009/0058185 A1* | 3/2009 | Schoettle | H02J 3/14 307/35 |
| 2009/0115609 A1 | 5/2009 | Weaver | |
| 2009/0121846 A1* | 5/2009 | Rye | H04B 3/56 340/12.37 |
| 2009/0143065 A1 | 6/2009 | Mattila | |
| 2009/0170525 A1 | 7/2009 | Baghdasaryan | |
| 2009/0177337 A1 | 7/2009 | Yuet et al. | |
| 2009/0207924 A1* | 8/2009 | Chan | H04B 3/54 375/260 |
| 2009/0250364 A1 | 10/2009 | Gerold et al. | |
| 2009/0251330 A1 | 10/2009 | Gerold et al. | |
| 2009/0251880 A1 | 10/2009 | Anderson | |
| 2009/0254203 A1 | 10/2009 | Gerold et al. | |
| 2009/0268380 A1* | 10/2009 | Brown | H02B 1/52 361/625 |
| 2009/0273436 A1 | 11/2009 | Gluck et al. | |
| 2009/0273465 A1 | 11/2009 | Shamir et al. | |
| 2009/0291722 A1 | 11/2009 | Li et al. | |
| 2010/0069087 A1 | 3/2010 | Chow et al. | |
| 2010/0096151 A1 | 4/2010 | Ostling | |
| 2010/0137021 A1 | 6/2010 | Sharret et al. | |
| 2010/0216415 A1 | 8/2010 | Arimura et al. | |
| 2010/0226391 A1* | 9/2010 | Miyazaki | H04B 3/542 370/468 |
| 2010/0282482 A1 | 11/2010 | Austin et al. | |
| 2011/0050501 A1 | 3/2011 | Aljadeff | |
| 2011/0087612 A1 | 4/2011 | Yuasa et al. | |
| 2011/0195701 A1 | 8/2011 | Cook et al. | |
| 2011/0202307 A1 | 8/2011 | Petereit et al. | |
| 2011/0215977 A1 | 9/2011 | Van Driel | |
| 2011/0273296 A1 | 11/2011 | Laase et al. | |
| 2011/0309931 A1 | 12/2011 | Rose | |
| 2012/0058759 A1 | 3/2012 | Lundborg | |
| 2012/0092811 A1* | 4/2012 | Chapel | H04L 12/10 361/622 |

(56) References Cited

U.S. PATENT DOCUMENTS

| | | | |
|---|---|---|---|
| 2012/0094683 A1 | 4/2012 | Yoeli | |
| 2012/0110329 A1 | 5/2012 | Brown et al. | |
| 2012/0111589 A1 | 5/2012 | Schmidt et al. | |
| 2012/0115623 A1 | 5/2012 | Van Driel | |
| 2012/0173033 A1* | 7/2012 | Tischer | H02J 3/14 700/295 |
| 2013/0109375 A1 | 5/2013 | Zeiler et al. | |
| 2013/0255980 A1 | 10/2013 | Linehan et al. | |
| 2014/0240125 A1 | 8/2014 | Burch et al. | |

FOREIGN PATENT DOCUMENTS

| | | |
|---|---|---|
| DE | 4429206 | 3/1996 |
| DE | 10029132 | 1/2002 |
| DE | 10029138 | 1/2002 |
| DE | 10037226 | 2/2002 |
| DE | 10238710 | 3/2004 |
| DE | 10303006 | 8/2004 |
| DE | 10309703 | 9/2004 |
| DE | 102004046415 | 4/2005 |
| DE | 202006014606 | 1/2007 |
| DE | 102005044649 | 4/2007 |
| EP | 268902 | 6/1988 |
| EP | 451482 | 10/1991 |
| EP | 674973 | 10/1995 |
| EP | 1411478 | 4/2004 |
| EP | 1902817 | 3/2008 |
| GB | 2387744 | 10/2003 |
| GB | 2405559 | 4/2006 |
| JP | 2005208808 | 8/2005 |
| WO | WO 9723986 | 7/1997 |
| WO | WO 200245029 | 6/2002 |
| WO | WO 2003044743 | 5/2003 |
| WO | WO 2004010387 | 1/2004 |
| WO | WO 2006036481 | 4/2006 |
| WO | WO 2007042924 | 4/2007 |
| WO | WO 2009013045 | 1/2009 |
| WO | WO 2010068438 | 6/2010 |
| WO | WO 2011008082 | 1/2011 |

OTHER PUBLICATIONS

United States Patent Office Final Rejection for U.S. Appl. No. 13/662,093 dated Nov. 13, 2015 (17 pages).
United States Patent Office Action for U.S. Appl. No. 14/185,594 dated Jan. 5, 2016 (8 pages).
Song, "Automatic Vehicle Location in Cellular Communications Systems," IEEE, vol. 43, No. 4, pp. 902-908, Nov. 1994.
Hull et al., "CarTel: A Distributed Mobile Sensor Computing System," MIT Computer Sci & AI Laboratory, SenSys, 2006.
Bar-Gera, "Evaluation of a Cellular Phone-Based System for Measurements of Traffic Speeds and Travel Times: A Case Study form Israel," Transportation Research Part C 15 (2007) pp. 380-391.
Renton et al., "Internet-Based Manufacturing Process Optimization and Monitoring System," Proceedings of the 2002 IEEE International Conference on Robotics & Automation, Washington, DC, May 2002.
Dewalt Mobile Lock GPS Locator with Anti-Theft Alarm DS500, pp. 1-11, 2007.
Dewalt Instruction Manual, Mobile Lock GPS Locator with Anti-Theft Alarm, Aug. 8, 2006, pp. 1-38.
Dewalt DS500 Quick Setup & Installation Guide, Mobile Lock GPS Locator with Anti-Theft Alarm, 2006, 2 pages.
PCT/US2012/062277 International Search Report and Written Opinion dated Mar. 4, 2013 (7 pages).
Construction Electrical Products, "Temporary Power Boxes", Jan. 25, 2013, 2 pages.
Leviton, "The Box Temporary Power Distribution Centers" <http://www.leviton.com/OA_HTML/SectionDisplay.jsp?section=40481&minisite=10251> webpage accessed Jan. 25, 2013.
Coleman Cable Inc., "Xtreme Box Temporary Power Distribution Centers" <https://www.ccixpress.com/webapp/wcs/stores/servlet/CategoryDisplay?catalogId=10101&storeId=10051&langId=-1&top=Y&bu=%24%24&categoryId=10645&channel=%24&customer=> webpage accessed Jan. 25, 2013.
Cooper Wiring Devices, "Temporary Power Solutions", publicly available at least as early as Jan. 25, 2013 (6 pages).
Coleman Cable Inc., "Temporary Lighting Contractor Jobsite Power", LT200-07-01, 2010, 48 pages.
Hubbell Wiring, "Single Pole Devices and Temporary Power" publicly available at least as early as Jan. 25, 2013 (10 pages).
Cooper Industries, "RhinoBox Power Centers—RB300, RB301, RB302, RB303, RB3001, RB3021" <http://www.cooperindustries.com/content/public/en/wiring_devices/products/temporary_power/rhinobox_power_centers/rhinobox_power_centers_rb300_rb301_rb302_rb303_rb3001_rb3021.html> webpage accessed Jan. 25, 2013.
United States Patent Office Action for U.S. Appl. No. 14/959,934 dated Mar. 9, 2016 (12 pages).
United States Patent Office Action for U.S. Appl. No. 13/662,093 dated May 28, 2015 (14 pages).
United States Patent Office Action for U.S. Appl. No. 13/662,093 dated Jun. 2, 2014 (12 pages).
United States Patent Office Final Rejection for U.S. Appl. No. 14/959,934 dated Aug. 29, 2016 (13 pages).
United States Patent Office Final Rejection for U.S. Appl. No. 14/959,934 dated Aug. 17, 2017 (16 pages).
United States Patent Office Action for U.S. Appl. No. 15/266,433 dated May 23, 2017 (7 pages).
United States Patent Office Action for U.S. Appl. No. 15/887,504 dated Aug. 24, 2018, 7 pages.

* cited by examiner

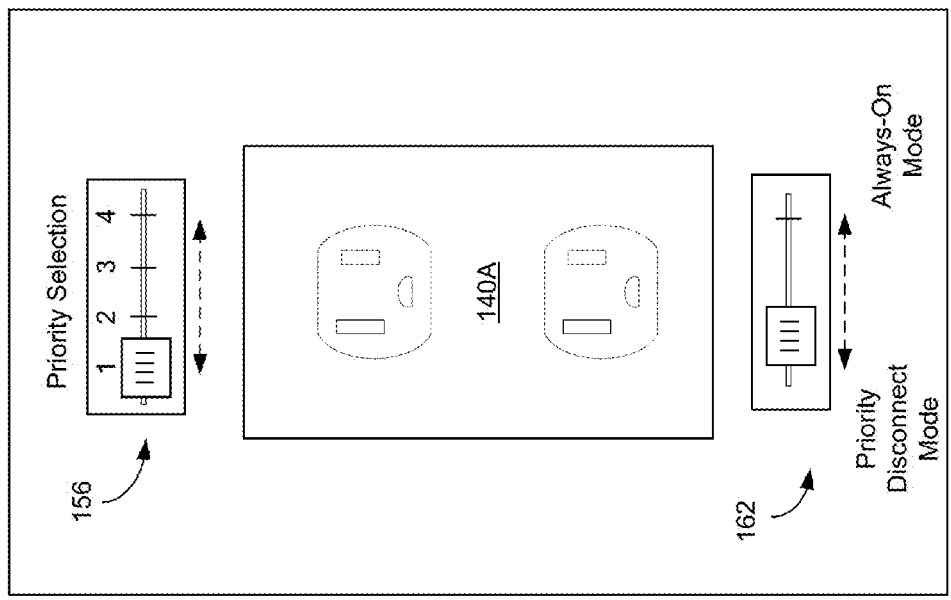
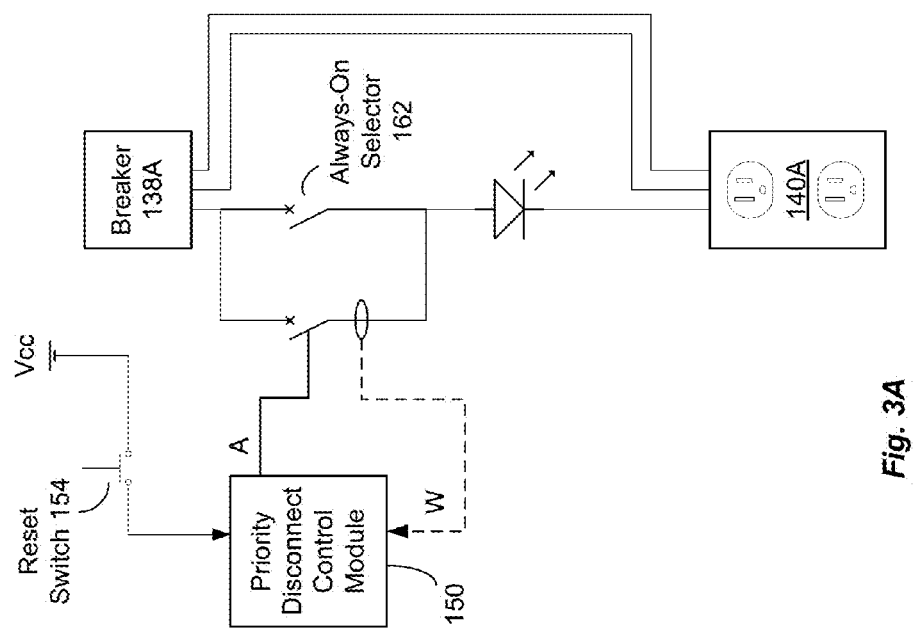
Fig. 3B
Fig. 3A

WORKSITE POWER DISTRIBUTION BOX

CROSS-REFERENCE TO RELATED APPLICATIONS

The Application claims priority to U.S. Provisional Patent Application No. 61/767,868, filed Feb. 22, 2013, the entire contents of which are hereby incorporated by reference.

FIELD OF THE INVENTION

The invention relates to systems and methods for distributing power at a worksite.

BACKGROUND

Temporary power systems distribute power at worksites, such as construction projects, where permanent power is not available. For instance, in constructing a building, an on-site generator may generate power for use by construction workers for powering various tools and items, such as power drills, saws, radios, computers, lighting, etc. Alternatively, a temporary connection to a power utility grid may be used.

SUMMARY

In one embodiment, a power distribution box is provided that includes a housing portion and a base portion elevating the housing portion above a surface on which the power distribution box is placed. The power distribution box further includes a power source input operable to receive power from an external power source; a plurality of alternating current (AC) output receptacles electrically coupled to the power source input; and a communication module. The communication module includes a network connecting module operable to connect to an external communication network, and a wireless network module operable to wirelessly communicate with an external device and to, thereby, connect the external device to the external communication network.

In another embodiment, a communication bridge method for a power distribution box is provided, the power distribution box including a housing portion with a plurality of AC output receptacles, a base that elevates the housing portion, a communication module having a network connecting module, and a wireless network module. The method includes positioning the power distribution box at a worksite; receiving, at a power input of the power distribution box, alternating current (AC) power from an external power source; and distributing the AC power received from the external power source to the AC output receptacles. The method further includes connecting the network connecting module of the power distribution box to an external communication network; and wirelessly communicating with an external device via the wireless network module of the power distribution box to thereby connect the external device to the external communication network.

In another embodiment, a priority disconnect method for a power distribution box is provided. The method includes receiving, at a power input of the power distribution box, alternating current (AC) power from an external power source; setting a priority level for each of a plurality of AC output receptacles of the power distribution box; and distributing the AC power received from the external power source to the AC output receptacles. The method further includes detecting a sum current level for the plurality of AC output receptacles; and determining that the sum current level exceeds a priority disconnect threshold. In response to determining that the sum current level exceeds the priority disconnect threshold, the method includes selectively disconnecting a first AC output receptacle of the plurality of AC output receptacles from the power input based on the priority level of the first AC output receptacle.

Embodiments of the invention involve distribution of temporary power using priority disconnects and the incorporation of wireless communication systems in a power box distribution network. Other aspects of the invention will become apparent by consideration of the detailed description and accompanying drawings.

BRIEF DESCRIPTION OF THE DRAWINGS

FIGS. 3A and 3B illustrate additional details of an outlet on a power box.

DETAILED DESCRIPTION

Figure 1:
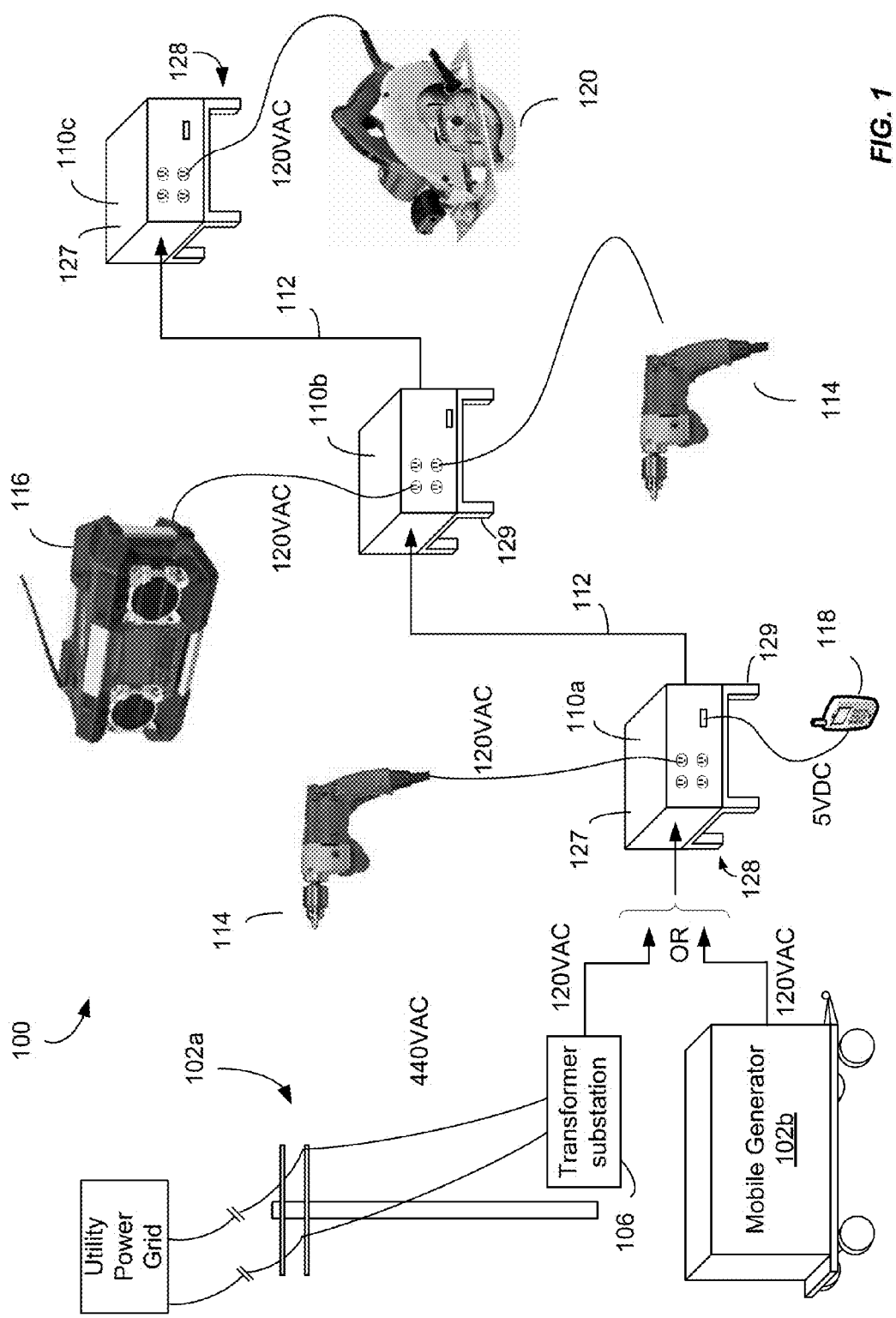
FIG. 1 illustrates a temporary power distribution system according to embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible. For example, "controllers" described in the specification can include standard processing components, such as one or more processors, one or more computer-readable medium modules, one or more input/output interfaces, and various connections (e.g., a system bus) connecting the components.

FIG. 1 illustrates an exemplary temporary power distribution system 100. The system 100 includes a power source 102, such as one or both of a utility grid power source 102a and a mobile generator power source 102b. One of the utility grid power source 102a and the mobile generator 102b is generally operating, while the other is either not present in the system 100 or on standby. In some instances, the mobile generator 102b acts as a backup power source in case of a power outage of the utility grid power source 102a.

The utility grid power source 102a is coupled to a local transformer substation 106 and provides a 50 Ampere (A), 440 volt, alternating current (VAC) power supply. The substation 106 transforms the input power to one or more 50 A, 120 VAC power supply lines, one of which is provided to the power distribution box ("power box") 110a. In some instances, the substation 106 is considered part of the utility grid power source 102a. The mobile generator 102b is also operable to output a 50 A, 120 VAC output to the power box 110a. The power box 110a receives the output of the power source 102 at an input receptacle, which is electrically coupled to an output receptacle of a power box 110a. A daisy chain cable 112 is coupled to the output receptacle of the power box 110a and to an input receptacle of a power box 110b. A power box 110c is similarly coupled by a daisy chain cable 112 to the power box 110b. Thus, the output of the power source 102 is shared among each of the power boxes 110. In some instances, the substation 106 and/or mobile generator 102b output multiple 50 A, 120 VAC outputs, each connected to a separate power box 110 or string of power boxes 110.

The power distribution boxes 110 distribute the received power to various outlets on each respective power distribution box 110. For example, each of the power distribution boxes illustrated in FIG. 1 include four 120 VAC outlets and two 5 volt, direct current (VDC) USB® type outlets, each powered by the power received at the input receptacle from the power source 102. At a worksite, various tools and other electronic devices may be coupled to the outlets of the power distribution boxes 110. For instance, the power distribution boxes 110 are coupled to one or more of an electric drill/driver 114 (120 VAC), a worksite radio 116 (120 VAC), a smart phone 118 (5 VDC); and a circular saw 120 (120 VAC).

The particular voltage levels of power lines described in this application are exemplary and approximate. For instance, the substation 106 may provide a single 240 VAC supply line to the power boxes 110, or two 120 VAC supplies lines that are combined to form a 240 VAC supply line. In such instances, the power boxes 110 may also include one or more 240 VAC outlets in addition to the 120 VAC outlets and 5 VDC USB® outlets. Additionally, the particular values are approximate and may vary in practice. For instance, the 120 VAC line may be nearer to about 110 VAC, and the 240 VAC supply line may be nearer to about 220 VAC. Furthermore, the power boxes 110 are illustrated and described herein as having common U.S.-style outlets and voltage levels. However, the power boxes 110 may be adapted for use with other outlet types and voltage levels, such as those common in Japan, Great Britain, Russia, Germany, etc.

The power boxes 110 further include a housing 127 with a base 128 to elevate the power boxes 110 above the ground, e.g., by 2 to 18 inches. The housing 127 may have a ruggedized construction including plastic and/or metal to withstand impacts, dropping, harsh weather, moisture, and other common wear and tear that occurs on a worksite. The base 128 includes legs 129. The base 128, housing 127, and legs 129 may be integral components or components that are secured to one another, e.g., via fasteners, welding, adhesive, etc. The elevation provided by the base 128 maintains the power boxes 110 out of water, dirt, contaminants, and hazardous materials that may be found on the ground of a worksite and that may pose issues to the power boxes 110 and safety risks.

Figure 2:
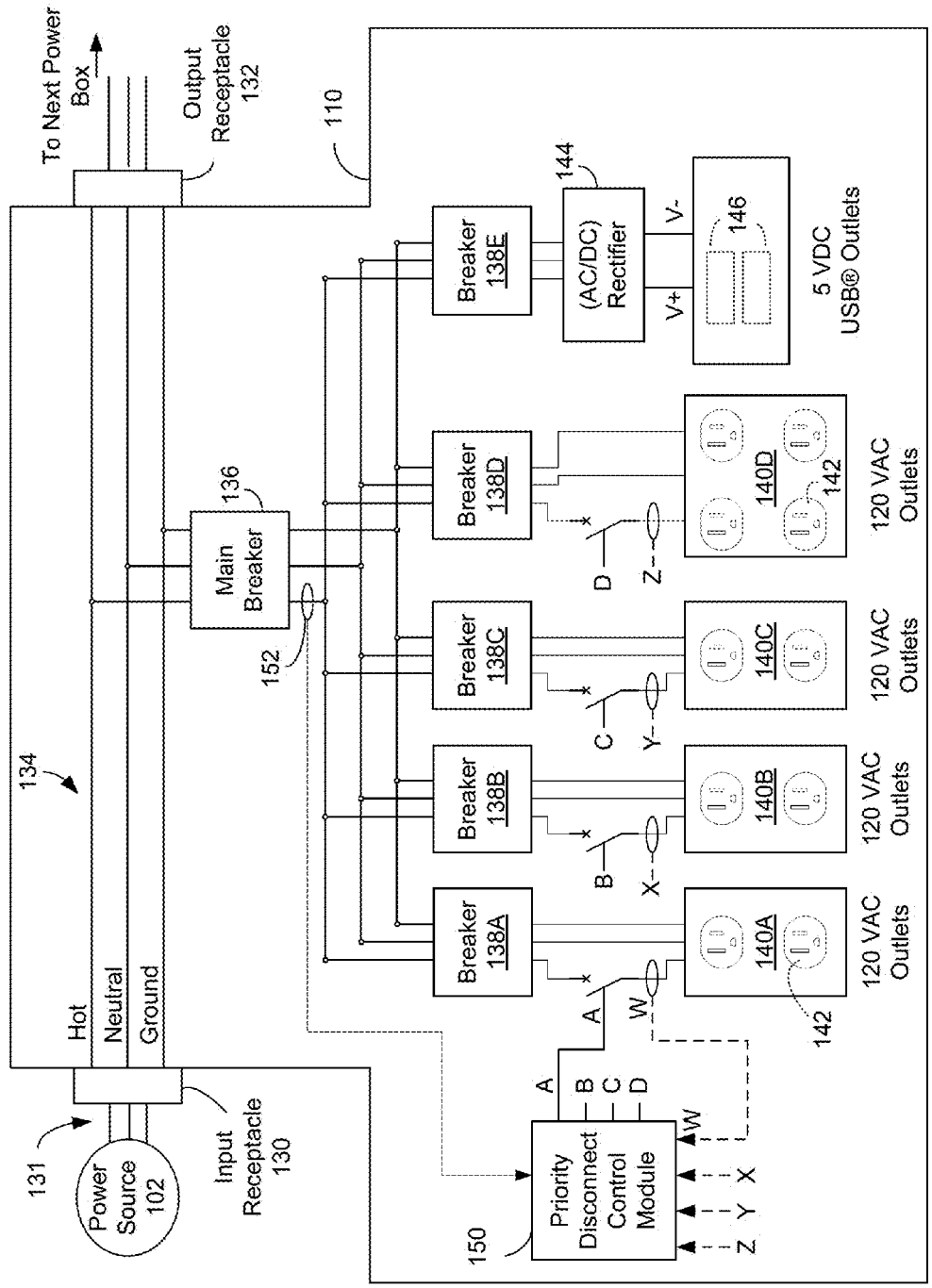
FIG. 2 illustrates a diagram of a power box having a priority disconnect module.

FIG. 2 illustrates the power box 110 in greater detail. As described above, the power box 110 includes an input receptacle 130 for receiving a 50 A, 120 VAC power supply line 131 from the power source 102. The input receptacle 130 is electrically coupled to the output receptacle 132 via power lines 134, which may then be coupled to another power box 110 via a daisy-chain cable 112. The power lines 134 include a hot, neutral, and ground line, which are coupled to a main circuit breaker 136. The main breaker 136 is a "slow-blow" breaker that selectively opens when the current level drawn downstream of the main breaker 136 exceeds a predetermined threshold, such as 20 A or 25 A, for a certain amount of time, such as 100 milliseconds (ms). When opened, the main breaker 136 severs the electrical connections between the power lines 134 and the sub-breakers 138. The main breaker 136 may be manually reset by a user to re-connect the power lines 134 to the downstream components, such as by flipping a toggle switch.

An output side of the main breaker 136 is coupled to several sub-breakers 138. The sub-breakers 138 are similar to the main breaker 136 in function and may have the same predetermined threshold as the main breaker 136, or a predetermined threshold that is lower than the main breaker 136, such as 15 A or 20 A. Each of the sub-breakers 138A-D is coupled to a respective outlet circuit 140A-D, each of which includes one or more 120 VAC output receptacles 142. Each output receptacle 142 may be a ground fault circuit interrupter (GFCI) circuit for further safety, and may include a test and reset button (not shown). Sub-breaker 138E is coupled to a rectifier 144 for converting the 120 VAC to 5 VDC for providing to two USB® outlets 146

The power box 110 further includes a priority disconnect control module ("PD module") 150. The PD module 150 is coupled to a current sensor 152 that monitors the current drawn by the sum of the components of the power box 110 downstream from the main breaker 136, including the current drawn via each of the outlet circuits 140A-D and USB® outlets 146. Although not shown, the PD module 150 and other non-illustrated circuits of the power box 110 are also powered by the power lines 134 via the main breaker 136.

The PD module 150 is further coupled to current sensors W, X, Y, and Z and to disconnect switches A, B, C, and D. The PD module 150 is operable to monitor the current drawn on the circuits of each of the breakers 138A-D. For instance, the current sensor W indicates the current drawn by the two receptacles 142 of the outlet circuit 140A. In some instances, a further current sensor and disconnect switch are provided for the USB® circuit of the breaker 138E.

The PD module 150 is also operable to control disconnect switches A, B, C, and D to selectively open and close. When a disconnect switch (e.g., switch A) is opened, the associated outlet circuit 140 becomes an open circuit that no longer conducts electricity to power a device plugged into one of the receptacles 142 of the outlet circuit 140.

The PD module 150 selectively opens and closes the disconnect switches A, B, C, and D dependent on one or more factors including predetermined current thresholds, outputs of the current sensors W, X, Y, and Z, and a disconnect scheme. For instance, the PD module 150 offers individual circuit protection for each of the outlet circuits 140A-D based on an individual circuit current threshold, which is generally set to trigger before the associated breaker 138A-D. For example, assuming the breaker 138A opens when current exceeds 15 A for 100 ms, the PD module 150 may selectively open the outlet circuit 140A when it exceeds an individual circuit current threshold of 14.5 A for 75 ms or 15 A for 50 ms.

The PD module 150 may leave the switch A open until a user reset or for a predetermined amount of time (e.g., five seconds). For instance, FIG. 3A illustrates a portion of the power box 110 of FIG. 2 wherein the PD module 150 includes a reset button 154 that indicates to the PD module 150 to close the switch A. Alternatively, a reset button 154 may manually close an associated disconnect switch.

Figure 4A:
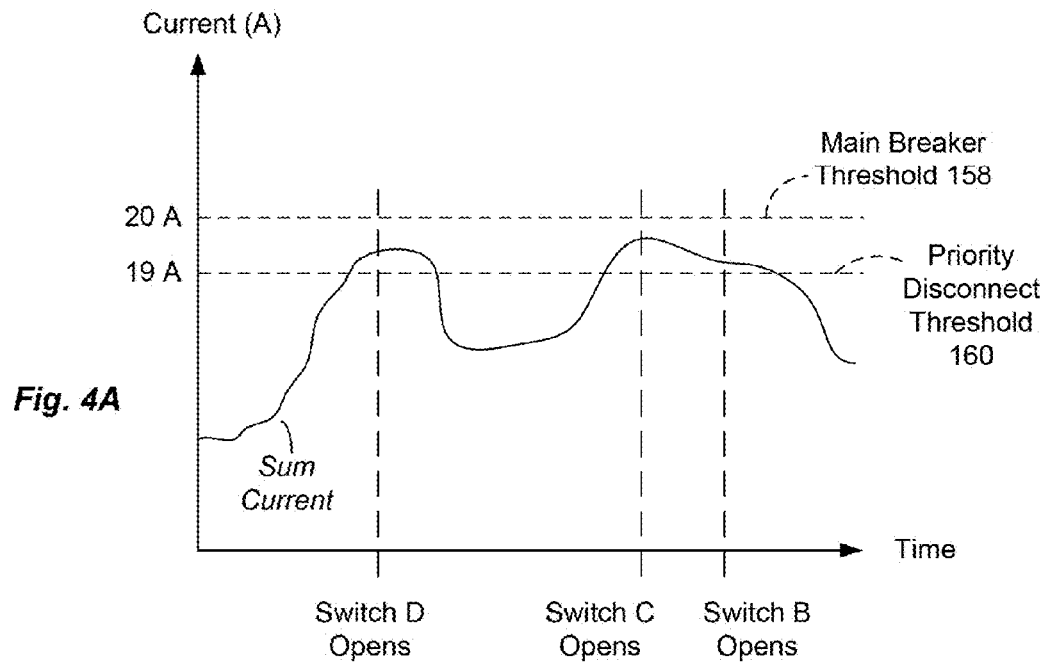
FIGS. 4A and 4B are power box current graphs.

In a first disconnect scheme, each outlet circuit 140A-D has a predetermined priority, which the PD module 150 uses to determine whether to open the associated disconnect switches A-D. For example, outlet circuit 140A has the highest priority (priority 1), outlet circuit 140B has priority 2, outlet circuit 140C has priority 3, and outlet circuit 140D has the lowest priority (priority 4). The PD module 150 monitors the sum current drawn by the sum of the outlet circuits 140 using either the sum of the outputs of the current sensors W, X, Y, and Z, or by using the current sensor 152. The PD module 150 also has a predetermined priority disconnect threshold that is set to trigger before the main breaker 136 opens. For instance, FIG. 4A illustrates a graph of sum current over time, a main breaker threshold 158 of the main breaker 136, and the priority disconnect threshold 160. The main breaker threshold 158 is set at 20 A, while the priority disconnect threshold is set at 19 A.

As shown in FIG. 4A, when the sum current first exceeds the priority disconnect threshold 160, the PD module 150 determines the disconnect switch has the lowest priority and opens the switch (e.g., disconnect switch D). In response, the sum current then drops below the priority disconnect threshold 160. Later, the sum current exceeds the priority disconnect threshold 160 again. The PD module 150 determines the disconnect switch of the remaining closed switches that has the lowest priority (i.e., disconnect switch C). As the sum current remains above the priority disconnect threshold after opening disconnect switch C, the PD module 150 determines and opens the disconnect switch having the lowest priority (i.e., disconnect switch B). The sum current then drops below the priority disconnect threshold, with only disconnect switch A remaining closed.

Figure 4B:
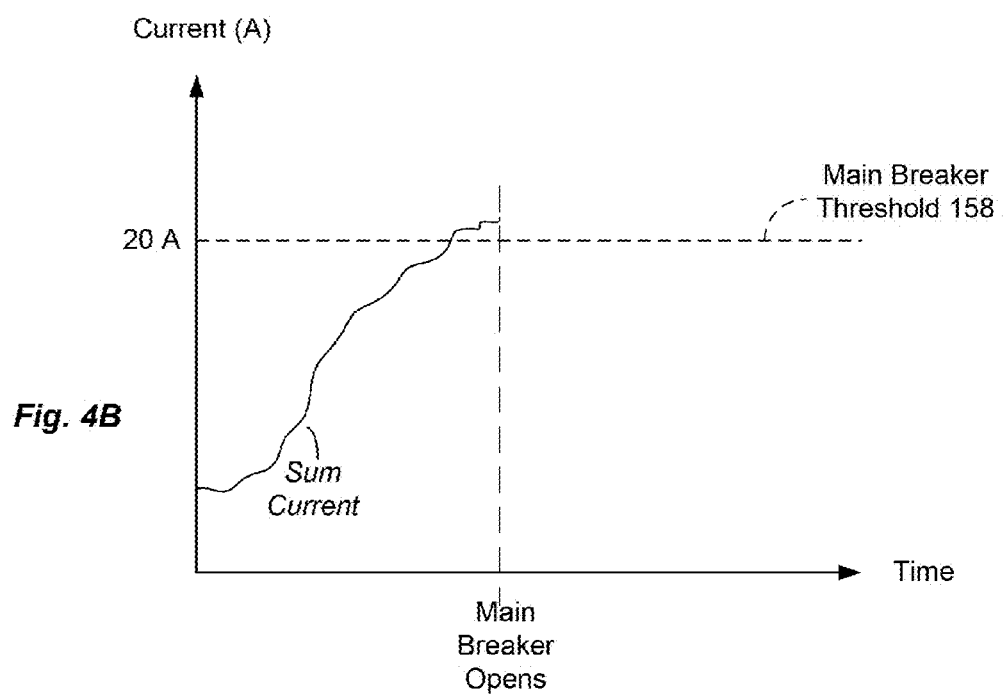

The PD module 150 automatically disconnects outlet circuits 140 based on priority to keep the main breaker 136 from opening. Accordingly, a high priority tool or device (e.g., worksite lighting) coupled to a high priority outlet circuit 140, such as the outlet circuit 140A, remains powered. In contrast, the main breaker of a power box without the priority disconnect scheme would likely have opened, severing power to all devices connected to the power box 110 (see FIG. 4B).

The priority levels may be set using various techniques. For instance, the priority levels may be pre-set, e.g., at the time of manufacture, or may be configurable by a user via a priority selector 156 associated with each outlet circuit 140 such as shown in FIG. 3B. The priority selector 156 provides an indication of the user's priority selection to the PD module 150. The priority selector 156 may have fewer or greater priority levels. For instance, the priority selector 156 may have merely a low and high priority selection, or the same number of priority levels as outlet circuits 140.

Additionally, in some instances, two outlet circuits 140 (e.g., 140A and 140B) may have the same priority (e.g., priority 1). If two outlet circuits 140 have the same priority, the PD module 150 may open both associated disconnect switches when the PD module 150 determines that (1) the priority disconnect threshold is exceeded and (2) the priority level of the two outlet circuits 140 are the lowest priority of the remaining outlets 140 having closed disconnect switches. In some instances, if two outlet circuits 140 have the same priority and the priority disconnect threshold is exceeded, the PD module 150 may determine which of the outlet circuits 140 has a larger current draw and open the disconnect switch associated with that outlet circuit 140.

In another disconnect scheme, an always-on selector 162 is provided for one or more of the outlet circuits 140. As shown in FIGS. 3A-B, the always-on selector 162 provides a bypass conducting path that bypasses an associated disconnect switch. Accordingly, even though the PD module 150 may control a disconnect switch to open, current is not interrupted to the associated outlet circuit 140. In an always-on mode, the breakers 136, 138 still provide circuit protection in the event of an over-current situation for an associated outlet circuit 140.

In another embodiment, the always-on selector does not physically bypass the disconnect switch. Rather, the always-on selector provides an indication to the PD module 150 whether the user has selected a priority disconnect mode or an always-on mode. While in always-on mode, the PD module 150 does not control the associated disconnect switch to open. In an always-on mode, the breakers 136, 138 still provide circuit protection in the event of an over-current situation for an associated outlet circuit 140.

In some embodiments, the outlet circuits 140 are considered either in an always-on mode or a low priority mode. When the priority disconnect threshold is exceeded, the PD module 150 determines the current level of each of the low priority outlet circuits 140 and opens the disconnect switch associated with the highest current drawing outlet circuit 140.

Figure 5:
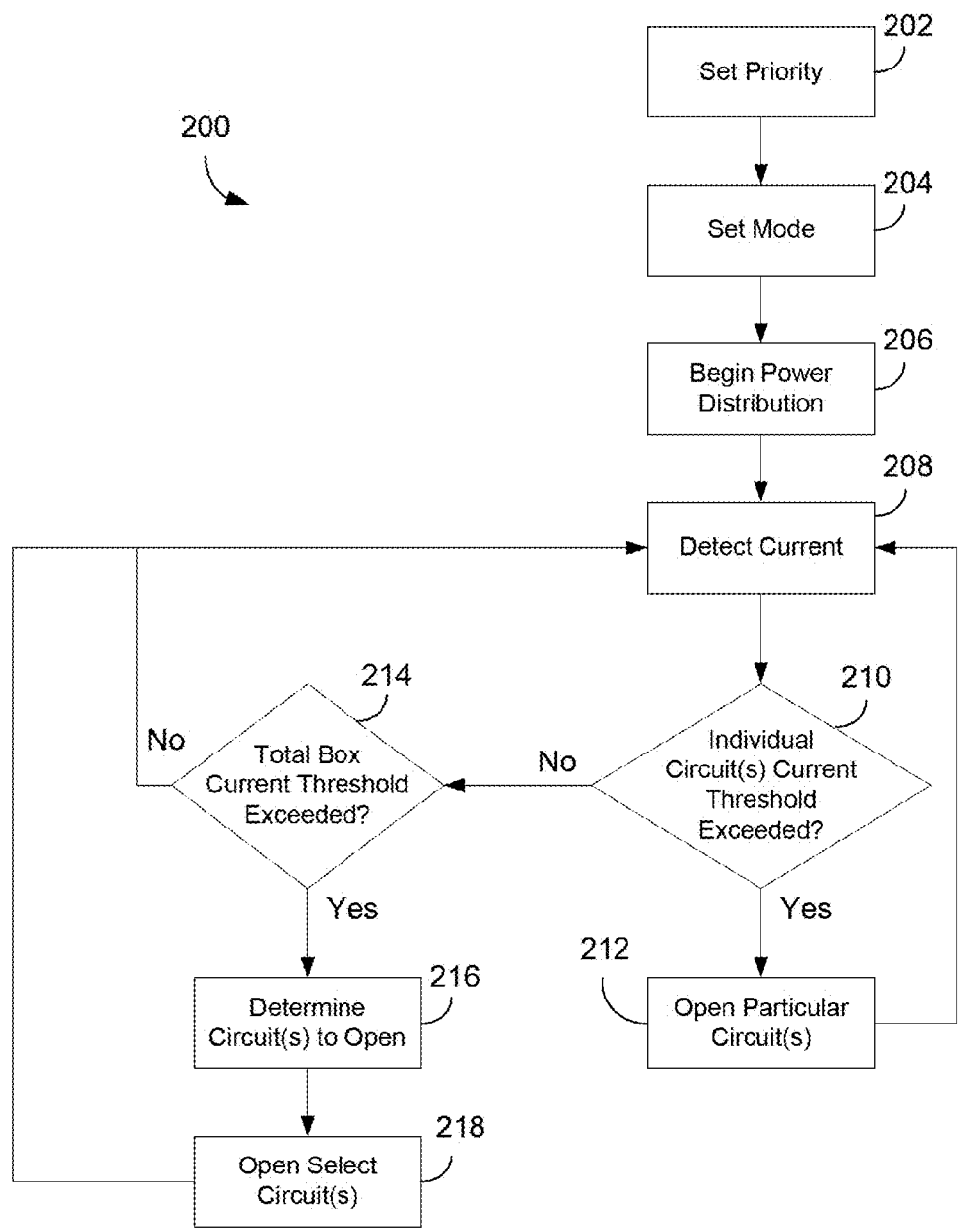
FIG. 5 illustrates a method of implementing a priority disconnect on a power box.

FIG. 5 illustrates a method 200 of implementing a priority disconnect scheme on the power box 110. In step 202, the priorities of the outlet circuits 140 are set. As noted, the priority levels may be set using various techniques, such as at the time of manufacture or by the priority selector 156. In step 204, the mode of the outlet circuits 140 are set to be either in an always-on mode or a priority disconnect mode. The mode of the outlet circuits 140 may be set using various techniques, such as at the time of manufacture or by the mode selector 162. In some instances, the outlet circuits 140 may have the mode setting feature or the priority setting feature, but not both. In such instances, the associated step 202 or 204 is bypassed.

In step 206, the power box 110 distributes power after being coupled to the power source 102 and after having one or more devices coupled to the receptacles 142. One or more of steps 202, 204, and 206 may be performed in a different order, simultaneously, and/or multiple times before reaching step 208.

In step 208, the PD module 150 detects various current levels of the power box 110. For instance, the PD module 150 monitors the outputs of the current sensors 152, W, X, Y, and Z. In step 210, the PD module 150 determines whether an individual circuit current threshold of one of the outlet circuits 140 has been exceeded based on outputs of the current sensors W, X, Y, and Z. If one or more individual circuit current thresholds have been exceeded, the PD module 150 opens the disconnect switches A, B, C, and/or D associated with the outlet circuit(s) 140A, B, C, and/or D having excessive current (step 212). If no individual circuit current thresholds have been exceeded, the PD module determines whether the sum current, e.g., as detected by current sensor 152, has exceeded the priority disconnect threshold (step 214). If not, the PD module 150 loops back to step 208 to again detect the current levels of the power box 110.

If the priority disconnect threshold has been exceeded, the PD module 150 determines in step 216 which of the disconnect switches A, B, C, and/or D to open based on the priorities and modes set in steps 202 and 204. For instance, in step 216, the PD module 150 determines which of the outlet circuits 140 has the lowest priority. Then, in step 218, the PD module 150 controls the disconnect switches A, B, C, and/or D associated with the determined, lowest priority outlet circuits to open. As described with respect to FIGS. 4A-B, the disconnect switch(es) are opened to reduce the current draw by the power box 110 to be below the priority disconnect threshold. If the opened disconnect switches succeed in reducing the sum current, the power box 110 will continue to distribute power on the outlet circuits 140 that remain active with closed disconnect switches. The sum current may remain above the priority disconnect threshold even with an opened disconnect switch if, for instance, the always-on mode selector 162 was active for that particular open circuit 140, or if the other outlet circuits 140 have high current levels. Accordingly, the PD module 150 cycles back to step 208 to proceed back through steps of the method 200 to determine whether to open further disconnect switches. In some instances, if a user alters priority or mode settings during steps 208-218, the method 200 returns to step 202 or 204, respectively.

In some embodiments, in step 216, the PD module 150 may also determine whether the outlet circuits 140 are in an always-on mode or a priority disconnect mode based on, for instance, on a signal provided by the selector 162. If one or more outlet circuit 140(s) are in an always-on mode, the PD module 150 excludes those outlet circuit 140(s) from being considered the lowest priority.

In some embodiments, the PD module 150 determines which of the lowest priority outlet circuits 140 is drawing the most current. Then, in step 218, the PD module 150 opens that high current outlet circuit 140.

Returning to FIG. 3A, the disconnect switches A, B, C, and D are each associated with indicator lights. The indicator lights may be, for example, light emitting diodes, that are selectively illuminated to indicate the status of the associated disconnect switch A, B, C, and D. For example, if the disconnect switch A is closed, the associated indicator light is activated to indicate to a user that the disconnect switch A is conducting and that the outlet circuit 140a is active. In other embodiments, the indicator lights are selectively controlled, e.g., by the PD module 150, to illuminate when an associated disconnect switch A, B, C, or D has been opened.

Figure 6:
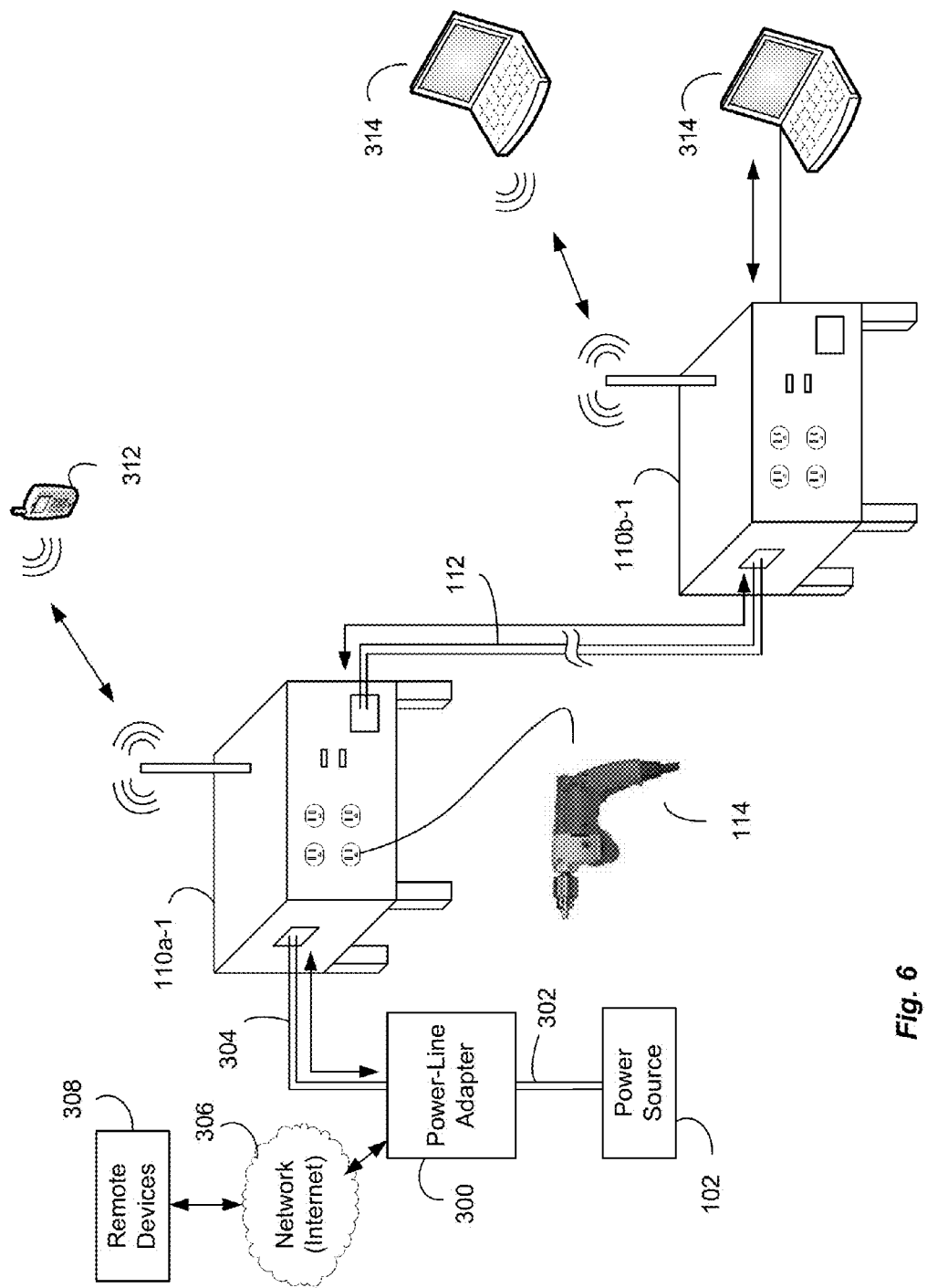
FIG. 6 illustrates a temporary power distribution system including power boxes with network communication capabilities.

FIG. 6 illustrates the power box 110 ($110_{a1}$ and $110_{b1}$) further including network communication capabilities. A power-line communication adapter ("adapter") 300 is positioned between the power box $110_{a1}$ and the power source 102. The adapter 300 is coupled to the power source 102 via incoming power line 302 and to the power box $110_{a1}$ via outgoing power line 304. The adapter 300 is operable to communicate over the power line 304. In other words, the power line 304 carries both AC power (e.g., 120 VAC) and data communication signals. For example, the adapter 300 may follow the IEEE 1901 communication protocol for communicating data over the power line 304.

The adapter 300 is in communication with an external network 306, such as a local area network (LAN), wide area network (WAN), the Internet, or a combination thereof. The adapter 300 may be coupled to the network 306 wirelessly (e.g., via a WiFi® connection) or via a wired connection (e.g., via an Ethernet connection). The network 306 enables the adapter 300 to communicate with remote devices 308 (e.g., servers) coupled thereto. The adapter 300 includes a modem (not shown) to enable communication with the network 306. In some instances, the modem has a separate housing that is external to a housing containing other components of the adapter 300.

The adapter 300 is operable to provide a communication bridge between the network 306 and the power box $110_{a1}$. The power box $110_{a1}$, in turn, is operable to provide a communication bridge between external devices (e.g., smart phone 312) and the adapter 300. Accordingly, the smart phone 312 is operable to communicate with and access the network 306 via the adapter 300 and power box $110_{a1}$ to access remote devices 308, the Internet, etc.

The power box $110_{b1}$ is coupled to the power box $110_{a1}$ via daisy chain cable 112. Three conductive paths (i.e., hot, neutral, and ground) are shared by the power box $110_{b1}$, power box $110_{a1}$, and adapter 300 via the cables 304 and 112. The power box $110_{b1}$, power box $110_{a1}$, and adapter 300 communicate over these shared power lines, for instance, by sending/receiving data packets using time-multiplexing. The power box $110_{b1}$, like the power box $110_{a1}$, is also operable to provide a communication bridge between external devices (e.g., laptops 314) and the adapter 300. Accordingly, the laptop 314 is operable to communicate with and access the network 306 via the adapter 300, the power box $110_{a1}$, and the power box $110_{b1}$.

Figure 7:
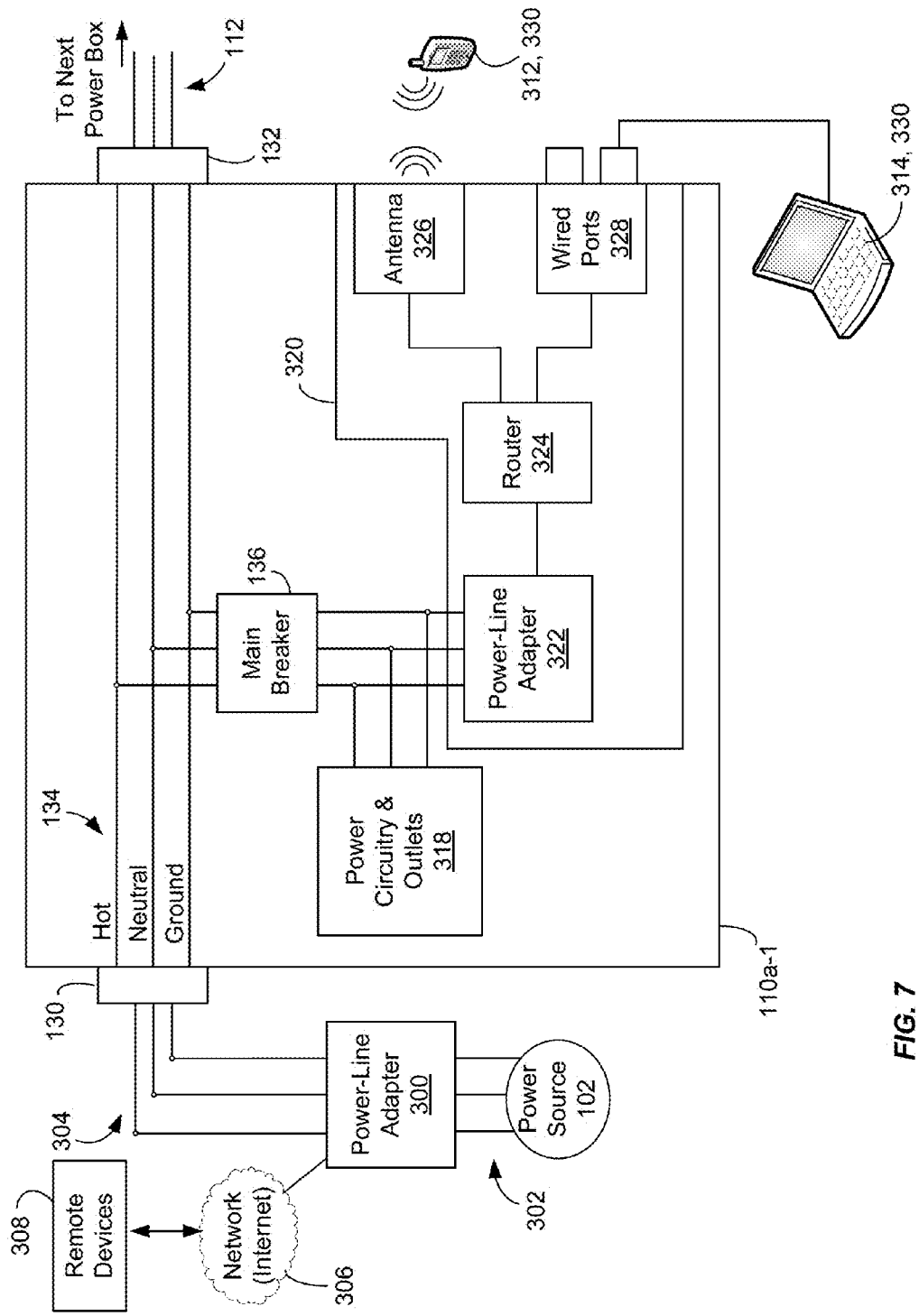
FIGS. 7-8 illustrate power boxes including network communication capabilities.

FIG. 7 illustrates the power box $110_{a1}$ having network communication capabilities in further detail. Within the power box $110_{a1}$ are power circuitry and outlets 318 and a communications module 320. The power circuitry and outlets 318 include the various components downstream from the main breaker 136 illustrated in and described with respect to FIG. 2, such as the breakers 138, outlet circuits 140, USB® outlets 146, PD module 150, etc.

The communications module 320 includes a power line adapter 322, a router 324, antenna 326, and wired ports 328. The power line adapter 322 is similar to the power line adapter 300, except that the power line adapter 300 also provides the interface to the network 306. Thus, the adapter 322 is operable to communicate over the power line 304, and internal power lines 134, such that the power lines 304, 134 carry both AC power (e.g., 120 VAC) and data communication signals. For example, the adapters 300 and 322 may follow the IEEE 1901 communication protocol for communicating data over the power line 304.

The adapter 322 is coupled to a router 324. The router 324 is operable to form communication links with external devices 330, such as smart phones 312 and laptops 314, via the antenna 326 and wired ports 328. The router 324 directs data between the adapter 322 and the external devices 330. In some instances, only the antenna 326 or the wired ports 328 are provided on the power box, rather than both, for wireless-only or wired-only communications.

Figure 8:
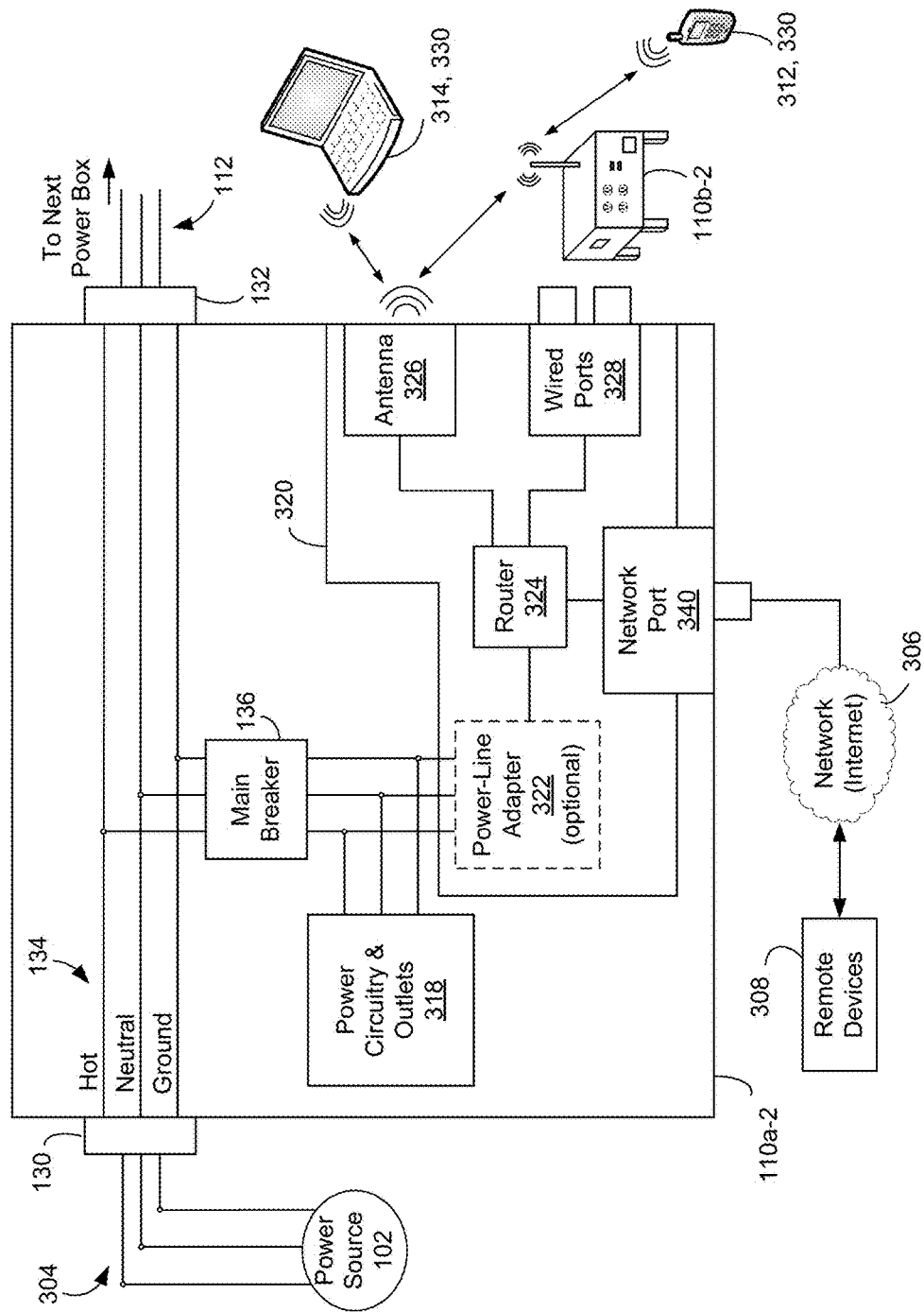

In some embodiments, alternative communication links are formed between the power box 110 and the network 306 and/or between multiple power boxes 110. For example, FIG. 8 illustrates the router 324 of the power box $110_{a2}$ in communication with the network 306 via a network port 340, rather than via the adapter 300, power line 304, and adapter 322. The router 324 may further include a modem, or a modem may be external to the power box 110$_{a2}$ between the network port 340 and the network 306. The wired connection between the network port 340 and the network 306 may be an Ethernet® connection.

In some embodiments, in place of the wired connection between the router 324 and the network 306 as illustrated in FIG. 8, the network 306 may be in communication with the router 324 of the power box 110$_{a2}$ using a wireless connection via the antenna 326. For instance, the network 306 may be coupled to a modem/router base station (not shown) external to the power box 110$_{a2}$ and having an antenna for wireless communication with the router 324 via the antenna 326.

In some embodiments, the power box 110 includes a cellular data modem to couple the router 324 to the network 306 via a cellular data connection, such as a 3G, 4G, EDGE, or GSM connection, instead of or in addition to a power line data connection, wired connection (e.g., an Ethernet® connection), or local wireless connection (e.g., a WiFi® connection).

The components of the power box 110 used to couple the power box 110 to the network 306 either directly or through another power box 110, such as the adapter 322 and/or the router 324, may be referred to as a network connecting module. The components of the power box 110 used to communicate with external devices 330, such as the router 324 and antenna 326, may be referred to as a wireless network module.

Returning to FIG. 8, the power box 110$_{a2}$ is in wireless communication with the laptop 314 similar to the configuration illustrated in FIG. 7. Furthermore, the power box 111a is in wireless communication with the power box 110$_{b2}$ using their respective antennas 326, rather than using the power-line adapter 300, 322 to communicate with the network 306. Additional power boxes 110 may be in wireless communication with the power boxes 110$_{a2}$ or 110$_{b2}$. Furthermore, the power boxes 110$_{a2}$ and 110$_{b2}$ may optionally include the power-line adapter 322 to communicate with other power boxes 110, such as those that are outside of wireless range of the power boxes 110$_{a2}$ and 110$_{b2}$.

Accordingly, the power boxes 110 are operable to form a wireless mesh network, a wired mesh network, or a combination thereof. With appropriate placement of power boxes 110 at a worksite, access to the Internet and/or other network 306 resources is available to worker devices (e.g., phones 312 and laptops 314) throughout the worksite.

Although not shown in detail, one or more of the output receptacles may include cables and receptacles with twist-to-lock/unlock mechanisms for securing cables to the power boxes 110. Additionally, the output receptacles may be recessed and include water-tight, hinged covers to prevent water ingress near the conductive elements. Alternative embodiments of the invention include different power, current, and voltage levels, different current thresholds, different numbers of output receptacles, and different types of output receptacles.

Thus, the invention provides, among other things, systems and methods for distributing temporary power including priority disconnect techniques and/or including communication networks. Embodiments of the invention relate to a power distribution box usable at a worksite to distribute temporary power. For instance, the power distribution box may include a power source input for receiving temporary power and also several standard outlets (e.g., 120 VAC, 60 Hz). The power distribution box may further include a power source output for connecting the power distribution box to another power distribution box. Thus, two or more power distribution boxes may be daisy chained together.

In one embodiment, a power distribution box is provided having a housing portion and a base portion elevating the housing portion above a surface on which the power distribution box is placed. The power distribution box further includes a power source input operable to receive power from an external power source; a plurality of alternating current (AC) output receptacles electrically coupled to the power source input; and a priority setting associated with each of the plurality of AC output receptacles. The power distribution box also includes a plurality of disconnect switches, each associated with a different one of the plurality of AC output receptacles; a sum current detector operable to detect the sum current conducted through the plurality of AC output receptacles; and a priority disconnect module coupled to the plurality disconnect switches and the sum current detector. The priority disconnect module is operable to determine that the sum current level exceeds a priority disconnect threshold; and in response to determining that the sum current level exceeds the priority disconnect threshold, control a first disconnect switch of the plurality of disconnect switches to selectively disconnect a first AC output receptacle of the plurality of AC output receptacles from the power input based on the priority level of the first AC output receptacle.

Various features and advantages of the invention are set forth in the following claims.

What is claimed is:

1. A power distribution box comprising:
a housing portion;
a base portion elevating the housing portion above a surface on which the power distribution box is placed;
a power source input operable to receive power from an external power source, the external power source and the power source input coupled to a first power line adapter;
a main breaker supported by the housing portion;
a plurality of alternating current (AC) output receptacles electrically coupled to the power source input; and
a communication module at least partially enclosed by the housing portion, the communication module including:
a second power line adapter connected to the main breaker and operable to connect to an external communication network, wherein the second power line adapter is downstream of the main breaker and the main breaker is connected to the power source input,
a router connected to the second power line adapter to, thereby, connect the router to the external communication network, and
an antenna connected to the router and operable to wirelessly communicate with an external device and to, thereby, connect the external device to the external communication network; and
a daisy-chain output of the power distribution box, the daisy-chain output directly electrically coupled to the first power line adapter via the power source input of the power distribution box and a cable coupled to the power source input and further directly electrically coupled via a daisy-chain cable to a second power distribution box, thereby connecting the external device to the second power distribution box via the antenna, the router, the second power line adapter, the main breaker, and the daisy-chain cable.

2. The power distribution box of claim 1, further comprising a power-line communication module operable to connect to a network connecting module of the second power distribution box over the daisy-chain cable.

3. The power distribution box of claim 1, further comprising a power cable coupled to the power source input and providing the power from the external power source, wherein the second power line adapter is operable to connect to the external communication network over the power cable and the first power line adapter.

4. The power distribution box of claim 1, further comprising a power cable coupled to the power source input and providing the power from the external power source, wherein the router is operable to connect to the external communication network via a wired connection separate from the power cable coupled to the power source input.

5. The power distribution box of claim 1, wherein the router is operable to connect to the external communication network wirelessly.

6. The power distribution box of claim 1, wherein the antenna is further operable to wirelessly communicate with a third communication module of a third power distribution box to connect the third communication module to the external communication network.

7. The power distribution box of claim 1, further comprising:
 a disconnect switch positioned between each AC output receptacle and the power source input;
 a priority level for each of the plurality of AC output receptacles; and
 a priority disconnect module operable to
  detect a sum current level for the plurality of AC output receptacles,
  determine that the sum current level exceeds a priority disconnect threshold, and
  selectively open at least one of the disconnect switches based on the priority levels in response to determining that the sum current level exceeds the priority disconnect threshold.

8. The power distribution box of claim 1, further comprising:
 a current sensor;
 a priority level for each of the plurality of AC output receptacles; and
 a priority disconnect module operable to disconnect at least one of the plurality of AC output receptacles from the AC power source input based on the priority levels and an output of the current sensor.

9. A communication bridge method for a power distribution box, the power distribution box including a housing portion and a communication module at least partially enclosed by the housing portion, the communication module having a first power line adapter connected to a main breaker, a router connected to the first power line adapter, and an antenna connected to the router, the method comprising:
 positioning the power distribution box at a worksite, the power distribution box including a plurality of AC output receptacles on the housing portion and a base that elevates the housing portion;
 receiving, at a power input of the power distribution box, alternating current (AC) power from an external power source, the external power source and the power input coupled to a second power line adapter;
 distributing the AC power received from the external power source to the plurality of AC output receptacles;
 receiving power, from the main breaker, at the first power line adapter, wherein the main breaker is supported by the housing portion;
 connecting the first power line adapter to an external communication network;
 connecting the router to the external communication network through the first power line adapter;
 wirelessly communicating with an external device via the antenna of the power distribution box to thereby connect the external device to the external communication network; and
 coupling a daisy-chain output of the power distribution box directly to the second power line adapter via the power source input of the power distribution box and further directly electrically coupling the daisy chain output of the power distribution box via a daisy-chain cable to a second power distribution box, thereby connecting the external device to the second power distribution box via the antenna, the router and the first power line adapter, the main breaker, and the daisy-chain cable.

10. A priority disconnect method for a power distribution box, the method comprising:
 receiving, at a power input of the power distribution box, alternating current (AC) power from an external power source, the power distribution box having a housing, a plurality of AC output receptacles supported by the housing, each of the plurality of AC output receptacles is associated with a corresponding manual priority level selector of a plurality of manual priority level selectors supported on the housing of the power distribution box, each one of the plurality of manual priority level selectors:
  is associated with a respective one of the plurality of AC output receptacles, and is configurable among a plurality of priority levels that are indicated on the manual priority level selector on the housing of the power distribution box for setting a priority level for disconnecting the associated respective one of the plurality of AC output receptacles;
 setting a priority level for each one of the plurality of AC output receptacles of the power distribution box according to a configuration of an associated respective one of the plurality of manual priority level selectors;
 distributing the AC power received from the external power source to the plurality of AC output receptacles;
 detecting a sum current level for the plurality of AC output receptacles;
 determining that the sum current level exceeds a priority disconnect threshold;
 in response to determining that the sum current level exceeds the priority disconnect threshold, selectively disconnecting a first AC output receptacle of the plurality of AC output receptacles from the power input based on the priority level set for the first AC output receptacle according to the priority levels configured on the plurality of manual priority level selectors on the housing of the power distribution box; and
 in response to receiving input at a manual reset selector that is associated with the first AC output receptacle and is supported on the power distribution box housing, selectively reconnecting the first AC output receptacle to the power input based on the input received at the manual reset selector.

11. The priority disconnect method of claim 10, further comprising:
 detecting individual current levels for each of the plurality of AC output receptacles;
 determining whether the individual current levels exceed an individual current threshold; and selectively disconnecting from the power input each of the plurality of AC output receptacles with individual current levels that exceed the individual current threshold.

12. The priority disconnect method of claim 10, further comprising:
opening a main breaker when current conducted via the main breaker exceeds a main breaker threshold, the main breaker positioned between the power input and the plurality of AC output receptacles and the main breaker threshold being higher than the priority disconnect threshold.

13. The priority disconnect method of claim 12,
opening a sub-breaker when current conducted via the sub-breaker exceeds a sub-breaker threshold, the sub-breaker positioned between the main breaker and a second AC output receptacle of the plurality of AC output receptacles, and the sub-breaker threshold being less than the main breaker threshold.

14. The priority disconnect method of claim 10, wherein selectively disconnecting the first AC output receptacle from the power input based on the priority level of the first AC output receptacle further comprises:
determining that the first AC output receptacle has a lowest priority level of the plurality of AC output receptacles.

15. The priority disconnect method of claim 10, wherein selectively disconnecting the first AC output receptacle from the power input based on the priority level of the first AC output receptacle further comprises:
determining that the first AC output receptacle and a second AC output receptacle of the plurality of AC output receptacles have equal priority levels, wherein the first AC output receptacle is selectively disconnected based on the first AC output receptacle conducting more current than the second AC output receptacle.

16. The priority disconnect method of claim 10, further comprising: selecting, individually for each of the plurality of AC output receptacles, one of an always-on mode and a priority disconnect mode via a mode selector on the housing of the power distribution box.

17. The priority disconnect method of claim 16, wherein selectively disconnecting the first AC output receptacle from the power input based on the priority level of the first AC output receptacle is further based on the first AC output receptacle having a lowest priority level of a subset of the plurality of AC output receptacles in the priority disconnect mode.

18. The priority disconnect method of claim 10, further comprising:
connecting a communication module of the power distribution box to an external communication network; and
connecting an external device to the external communication network via the communication module.

19. The power distribution box of claim 1, further comprising a plurality of breakers of the plurality of alternating current (AC) output receptacles, the plurality of breakers connected to an output of the main breaker, and wherein the power line adapter is connected to an output of the main breaker and upstream of the plurality of breakers.

20. The priority disconnect method of claim 10, wherein setting, at the plurality of manual priority level selectors, the priority level for each of the plurality of AC output receptacles of the power distribution box, includes:
setting a first priority level of a first AC output receptacle of the plurality of AC output receptacles via a first manual priority level selector of the plurality of manual priority level selectors; and
setting a second priority level of a second AC output receptacle of the plurality of AC output receptacles via a second manual priority level selector of the plurality of manual priority level selectors;
wherein the first priority level and the second priority level have different priority levels.

21. The communication bridge method of claim 9, further comprising:
wirelessly communicating with a third power distribution box via the antenna of the power distribution box and an antenna in the third power distribution box to thereby connect the third power distribution box to the external communication network via the router and the first power line adapter.

22. The priority disconnect method of claim 10, wherein the housing includes a base portion elevating the housing above a surface on which the power distribution box is placed.

* * * * *